United States Patent
Doshi et al.

(10) Patent No.: US 11,256,489 B2
(45) Date of Patent: Feb. 22, 2022

(54) NESTED LOOPS REVERSAL ENHANCEMENTS

(71) Applicant: INTEL CORPORTATION, Santa Clara, CA (US)

(72) Inventors: Gautam Doshi, Bangalore (IN); Rakesh Krishnaiyer, Milpitas, CA (US); Rama Kishan Malladi, Bangalore (IN)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 16/640,560

(22) PCT Filed: Sep. 22, 2017

(86) PCT No.: PCT/US2017/052964
§ 371 (c)(1),
(2) Date: Feb. 20, 2020

(87) PCT Pub. No.: WO2019/059927
PCT Pub. Date: Mar. 28, 2019

(65) Prior Publication Data
US 2020/0371763 A1 Nov. 26, 2020

(51) Int. Cl.
*G06F 8/41* (2018.01)
*G06F 8/20* (2018.01)

(52) U.S. Cl.
CPC ............ *G06F 8/4442* (2013.01); *G06F 8/20* (2013.01); *G06F 8/452* (2013.01)

(58) Field of Classification Search
None
See application file for complete search history.

(56) References Cited

U.S. PATENT DOCUMENTS

| | | | |
|---|---|---|---|
| 5,752,037 A | 5/1998 | Gornish et al. | |
| 6,070,011 A * | 5/2000 | Liu | G06F 8/433 717/154 |
| 6,192,515 B1 * | 2/2001 | Doshi | G06F 8/4452 712/241 |
| 6,567,976 B1 | 5/2003 | Wolf et al. | |
| 7,765,534 B2 | 7/2010 | Archambault et al. | |
| 8,671,401 B2 | 3/2014 | Puri et al. | |
| 2004/0003386 A1 * | 1/2004 | Tai | G06F 8/443 717/160 |
| 2004/0015934 A1 * | 1/2004 | Muthukumar | G06F 8/4452 717/160 |
| 2009/0222791 A1 * | 9/2009 | Togawa | G06F 8/4442 717/106 |

(Continued)

OTHER PUBLICATIONS

International Search Report and Written Opinion for International Patent Application No. PCT/US2017/52964, dated Jun. 15, 2018, 13 pages.

*Primary Examiner* — Qing Chen
(74) *Attorney, Agent, or Firm* — Jordan IP Law, LLC

(57) ABSTRACT

Systems, apparatuses and methods may provide for technology to identify in user code, a nested loop which would result in cache memory misses when executed. The technology further reverses an order of iterations of a first inner loop in the nested loop to obtain a modified nested loop. Reversing the order of iterations increases a number of times that cache memory hits occur when the modified nested loop is executed.

24 Claims, 8 Drawing Sheets

(56) References Cited

U.S. PATENT DOCUMENTS

| | | | |
|---|---|---|---|
| 2009/0254733 A1 | 10/2009 | Chen et al. | |
| 2010/0070956 A1* | 3/2010 | Leung | G06F 8/452 |
| | | | 717/143 |
| 2010/0218196 A1* | 8/2010 | Leung | G06F 8/453 |
| | | | 718/107 |
| 2010/0299656 A1* | 11/2010 | Shah | G06F 8/45 |
| | | | 717/132 |
| 2015/0277876 A1* | 10/2015 | Yamanaka | G06F 8/443 |
| | | | 717/152 |
| 2017/0039048 A1* | 2/2017 | Gschwind | G06F 8/452 |

* cited by examiner

NESTED LOOPS REVERSAL ENHANCEMENTS

CROSS REFERENCE TO RELATED APPLICATIONS

The present application is a U.S. National Phase Patent Application, which claims the benefit of priority to International Patent Application No. PCT/US2017/052964 filed on Sep. 22, 2017.

TECHNICAL FIELD

Embodiments generally relate to compilers. More particularly, embodiments relate to compilers that enable enhanced performance with respect to nested loops.

BACKGROUND

Compilers may be used to transform human readable source code into executable object code in a variety of settings. Source code may include loops such as, for example, "do . . . while loops," "for loops" and "while loops." Source code may include nested loops (e.g., loops within loops) that involve performing iterative operations (e.g., "iterations"). Nested loops may have data being accessed in those loops as a function of the loop indices or iteration. Conventional compilers may attempt to optimize the loop nests in various ways. Such optimizations may still result in cache misses, which may increase the overhead and in turn reduce overall performance by, for example, slowing down an overall process executing the source code.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
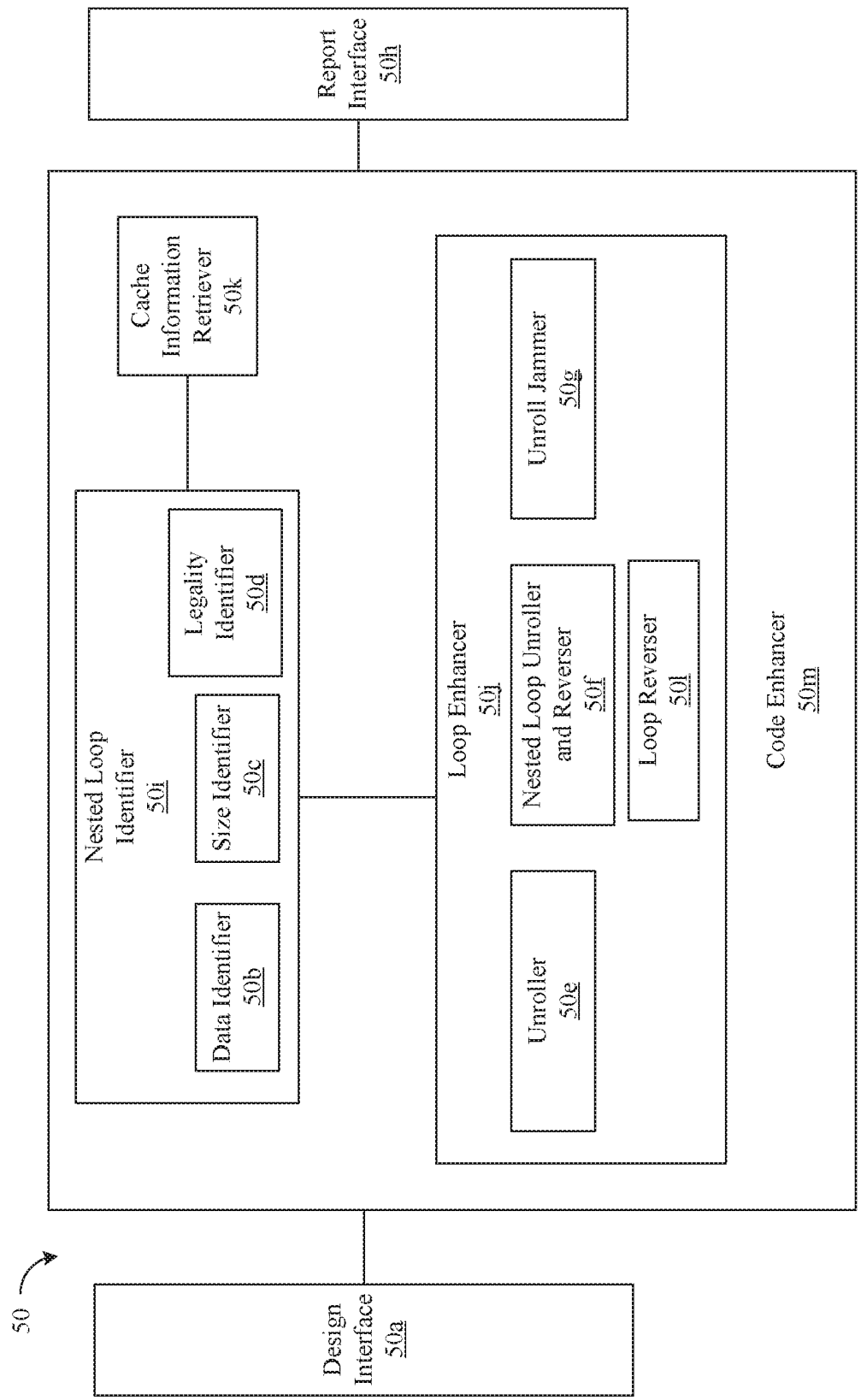
FIG. 1 is a block diagram of an example of a logic architecture according to an embodiment.

Turning now to FIG. 1, a logic architecture 50 (50a-50m) is shown. A code enhancer 50m may generally be used as a compiler or other suitable code utility to transform user code into, for example, executable object code. More particularly, the architecture 50 may implement (e.g., as logic instructions, configurable logic, fixed-functionality hardware logic, etc., or any combination thereof) methods 28 and 60 discussed below. In the illustrated example, a design interface 50a (e.g., keyboard, microphone, network controller) is configured to receive user code, and a nested loop identifier 50i of the code enhancer 50m is coupled to the design interface 50a. The nested loop identifier 50i may identify nested loops, and a loop enhancer 50j of the code enhancer 50m may enhance a nested loop identified by the nested loop identifier 50i. The code enhancer 50m may include a cache information retriever 50k, which may determine a size of a cache (e.g., a multi-level cache, not shown) of a computing system that is to execute the user code, as well as a size of an available space of the cache. In some embodiments, the computing system may be a computing device (e.g., laptop, server, mobile device, etc.) that executes both the compiler and the executable object code. The user code may be written in a high level programming language.

The nested loops identified by the nested loop identifier 50i may be enhanced by different compiler modifications, such as an unroll executed by the unroller 50e and an unroll and jam which may be executed by the unroll jammer 50g, to improve loop performance. Such enhancements may be improved further by a loop reversal enhancement executed by the nested loop unroller and reverser 50f or loop reverser 50l to benefit from temporal locality of data which is last accessed, and therefore likely to be stored in cache (not illustrated), which may also be referred to as cache memory. Without this reversal, the data that gets reused by the inner loop(s) of a nested loop across outer loop iterations may have degraded performance due to extra cache misses since data may have been evicted from the cache. A cache hit may mean that data requested for processing by a component (e.g., Central Processing Unit) or application is found in the cache memory, whereas a cache miss may occur when the data is not found in cache memory. The nested loop identifier 50i may analyze the user code to identify code which may be enhanced by performing a loop reversal, or an outer loop unroll, followed by an inner-loop reversal to improve data reuse and/or cache hits. This may enhance application performance by decreasing the time needed to execute the user code by reducing the cache misses and increasing data reuse. Therefore, high performance computing (HPC) applications may have enhanced memory bandwidth which is reduced. As discussed above, the loop reversal enhancements may apply to such loops which have a reuse of data in a loop-nest and that data is likely to have cache misses due to cache capacity limits.

For example, some user code may consistently result in data cache misses when different loop modifications are applied to the user code, and/or may not reuse data efficiently. A user code may include a nested loop which includes an outer loop and an inner loop, as pictured and labeled below in Table I:

TABLE I

| loop 'j=0:M'. | // Outer Loop |
| --- | --- |
| { | |
| loop 'i=0:N' | //Inner Loop |
| { | |
| x[j][i] | += y[i]; |
| } | |
| } | |

The outer loop iterates for 0-M, and the inner loop iterates from 0-N for each iteration of the outer loop. The user code may be modified by an outer loop unroll, for example by the unroller 50e, to the following Table II:

TABLE II

```
// Outer loop unroll
loop 'j=0:M:2'                    //Outer Loop
{
    loop 'i=0:N'                  //First Inner Loop
    {
        x[j][i]         += y[i];
    }
    loop 'i=0:N'                  //Second Inner Loop
    {
        x[j+1][i]       += y[i];
    }
}
```

The following expression is provided in the pseudo code: lower-bound:length:stride. Thus, syntax "j=0:M:2" means T increments in steps of 2 from 0 to M. That is, the first two values provide the lower bound and length of the operation, while the third value is the stride, increment or step. As such, during the first iteration of the outer loop, j will equal 0; during the second iteration of the outer loop, j will equal 2; during the third iteration of the outer loop j will equal 4; and so on until M is exceeded by j.

An outer loop unroll may replicate the user code inside an original inner loop a number of times. The replicated inner loops are adjusted so that each inner loop operates over a different element (e.g., different element of the array data structure x) in order for each of the inner loops to perform the operations of a different iteration of outer loop. Thus, the inner loop is re-written as a repeated sequence of similar independent statements. The number of repeated sequences is called the loop unrolling factor. The number of iterations of the outer loop is divided by the loop unrolling factor. Thus, due to the modified replicated inner loops, each iteration of the outer loop of the unrolled user code may perform the operations of several iterations of the original, rolled user code. The final computations (e.g., the modifications to the array data structure x) between the original, rolled user code and the unrolled user code should be identical.

The outer loop unroll code includes a first inner loop (labeled above) which iterates from 0 to n (i.e., "i=0:n"), and a second inner loop (labeled above) which iterates from 0 to n as well. If all of the data used by the first inner loop has a size greater than the available space of the cache memory, then the cache misses will be suffered by the second inner loop. For example, say "N" is set to three, then the first inner loop will iterate from i=0 to i=3. Further suppose that the cache can store the data of "y[i]" for only two iterations out of the four iterations of the first inner loop. When the first inner loop has completed iterations 0-3, the cache would store data for y[2] and y[3]. The second inner loop would execute next, and require data for y[0], which is not stored in the cache. Therefore, a cache miss would occur, and the data for y[0] would need to be retrieved from storage and stored into the cache, thereby moving y[2] or [y[3] out of the cache. This process would repeat for the remainder of the iterations of the second inner loop, and cache misses would occur for y[0], y[1], y[2] and y[3].

Thus, a loop reversal may enhance cache hits by reversing the direction or order of the iterations of the second loop, so that the reversed second loop iterates in reverse order to iterate from higher numbers to lower numbers, for example by setting the control variable "i" (i.e., a loop counter) to iterate from "N:0" rather than "0:N." Returning to the above example, this would allow y[3] to be accessed during the first iteration of the reversed second inner loop, which would be stored in the cache.

Likewise, across iterations of the outer loop of the outer loop unrolled pseudo code, cache misses may occur. For example, if during a first iteration (e.g., j=0) of the outer loop, the second inner loop has finished executing. The data for y[2] and y[3] would be stored in the cache. During the next iteration (e.g., j=2) of the outer loop, the first inner loop requires the data for y[0] which is not stored in the cache, which results in a cache miss as described above. Likewise, a cache miss would be suffered for the data of y[1], y[2] and y[3].

The reversal of the second inner loop may also result in an increase in cache hits across iterations of the outer loop (i.e., "j=0:M:2") since the first inner loop traverses in an opposite order from the reversed second inner loop. Returning to the above example again, data for y[0] and y[1] would be stored in the cache when the reversed second inner loop finishes executing during a first outer loop iteration (e.g., j=0), and the first inner loop during a second outer loop iteration (e.g., j=2) may execute first based upon y[0], and then upon y[1] which would be stored in the cache.

The user code may also be modified based upon a loop unroll and jam (which may also be referred to as an unroll-jam). An outer loop unroll of a factor is as described above, and the resulting inner loops are jammed or fused together. This would transform the user code into Table III:

TABLE III

```
// Loop unroll-jam
loop 'j=0:M:2'                    //Outer Loop
{
    loop 'i=0:N'                  //Inner Loop
    {
        x[j][i]         += y[i];
        x[j+1][i]       += y[i];
    }
}
```

Again however, cache misses may occur across different outer loop iterations, similar to as described above. For example, after each iteration of the outer loop (i.e., "j=0:M:2"), the data stored in the cache for y[i] (e.g., cache stores the data for y[2] and y[3]) may not be the data (i.e., y[0]) needed by the inner loop (i.e., loop "i=0:N") during the following iteration of the outer loop. Thus, cache misses may occur, even though registers may reuse data within inner loop iterations.

The loop enhancer 50*j* may include the nested loop unroller and reverser 50*f* and the loop reverser 50*l*. The loop reverser 50*l* may reverse an order of iterations of an inner loop of a nested loop. The loop reverser 50*l* may not unroll an outer loop of the nested loop. For example, the nested loop identifier 50*i* may identify a nested loop which results in cache misses, and an inner loop of the nested loop which may be modified to enhance cache hits. The loop reverser 50*l* may reverse the order of iterations of the identified inner loop.

The nested loop unroller and reverser 50*f* may unroll, and then reverse the user code. For example, the user code above may be modified by the unroller and reverser 50*f* to the following Table IV:

TABLE IV

```
loop 'j=0:M:2'              //Outer Loop
{
    loop 'i=0:N'            //First Inner Loop
    {
        x[j][i] += y[i];
    }
    // Loop reversal optimization
    loop 'i=N:0'            //Second Inner Loop
    {
        x[j+1][i] += y[i];
    }
}
```

As illustrated above, the outer loop of the user code is first unrolled into two inner loops. The first inner loop iterates from 0:N, and in contrast the second inner loop is reversed to iterate from N:0. This is in contrast to the outer loop unroll above without the reversal, in which both the first and second inner loops iterate from 0:N. Therefore, a control variable "i" for the first inner loop may be incremented during each iteration of the first inner loop, and a control variable "i" of the second inner loop may decremented during each iteration of the second loop so that the first and second inner loops traverse in an opposite manner to each other. This may be modified so that the first inner loop is reversed rather than the second inner loop.

By doing so, cache hits may be increased. As already noted, a cache hit may mean that data requested for processing by a component (e.g., Central Processing Unit) or application is found in the cache memory, whereas a cache miss may occur when the data is not found in cache memory. For example, in the same outer loop iteration, the data accessed by the first inner loop (e.g., y[n]) during a last iteration of the first inner loop, will be the same data (e.g., y[n]) accessed by the second inner loop during a first iteration of the second inner loop. Furthermore, across different outer loop iterations, the data accessed by the second inner loop (e.g., y[0]) during a last iteration of the second inner loop, is accessed by the first inner loop during a first iteration of the first inner loop. For example, the data last accessed by the second inner loop (e.g., y[0]) during a first iteration of the outer loop (e.g., j=0) is accessed first by the first inner loop during a second iteration of the outer loop (e.g., j=2). Therefore, due to the temporal proximity of accessing data by the first and second inner loops, more cache hits may occur thereby reducing overhead and enhancing operation speed. The "reversed" second inner loop may be vectorized and prefetched effectively on modern ISAs (e.g., AVX2 and AVX512) thus minimizing negative performance effects for the backward running loop.

The loop reversal as well as the loop unroll and reversal is orthogonal to other operations such as the outer loop unroll and the unroll and jam. Therefore, the loop reversal, the loop unroll and reversal, the unroll and the unroll and jam may be executed independently of each other or may be combined to be interdependently executed. For example, an unroll and jam legality may not be satisfied so that the unroll and jam cannot be executed, but the outer loop unroll and reversal may be legal.

The nested loop identifier 50i may identify nested loops, and further identify nested loops which are to be enhanced by the loop enhancer 50j. The nested loop identifier 50i may include a data identifier 50b, a size identifier 50c and a legality identifier 50d.

The data identifier 50b may determine whether data being accessed by the inner loop of the nested loop of the user code is invariant across iterations of the outer loop. For example, if the same data (e.g., y[i]) may be accessed across iterations of the outer loop (i.e., the "j loop") by the inner loop (i.e., the "i loop"), then the data is invariant across iterations of the outer loop. In some embodiments, if the same data is accessed by the inner loop of user code during a first iteration of the outer loop (e.g., j=0), a second iteration of the outer loop (e.g., j=1) and so on for the other iterations of the outer loop, the data may be considered invariant across iterations of the outer loop. If data is invariant across iterations of the outer loop, the data identifier 50b may identify the nested loop as utilizing invariant data.

The size identifier 50c may identify whether the inner loop may access a total size of data which exceeds an available memory of cache. The available memory of the cache may be provided by the cache information retriever 50k. The cache information retriever 50k may retrieve the cache size, and an available memory of the cache size from the computing device which is to execute the user code. Available memory may mean memory which may store data. If the total size of the data is larger than the available memory of the cache, cache misses may occur since not all of the data to be accessed by the inner loop may be stored in the cache. For example, accesses to a total data size of "y[0]-y[n]" that do not fit in the available cache capacity may suffer cache misses. This may determine when the total amount of data accessed in the inner-loop exceeds, for example, an L3 cache-size.

The legality identifier 50d may identify whether a modification (e.g., loop reversal, outer loop unroll and inner-loop reversal, unroll and jam, unroll, etc.), to the nested loop is legal. Legal may mean whether the modification is to be permitted. If a modification is illegal, the modification may give wrong results or may have a failure during execution (e.g., runtime). For example, the outer-loop unroll may be determined to be legal by the legality identifier 50d if it is possible for the loop enhancer 50j to modify the inner loop to include a second inner loop to include the removed iterations of the outer loop. In one instance, if the outer loop is unrolled by a factor of two (i.e., the outer loop increments by two instead of one), the second inner loop may cover the outer loop iterations which are skipped (e.g., the odd numbered outer loop iterations), while the first inner loop covers the even numbered outer loop iterations. The legality identifier 50d may further determine that an inner-loop reversal (e.g., reverse the second inner loop) may be performed when there are no loop-carried dependencies. For example, if in the inner loop of the original user code, an iteration of the inner loop depends on a previous iteration of the inner loop, then a loop-carry dependency is identified, and a loop reversal may be identified as being illegal.

The legality identifier 50d may also identify whether an unroll jam and unroll is legal. For example, unroll and jam legality may not be satisfied when there are flow/anti/output dependences with accesses of the form a(i, j) and a(i−1,j+1) creating a (<,>) direction vector, which means that dependence is carried by the outer loop, with a distance value that is less than the unroll and jam factor.

While not illustrated, the nested loop identifier 50i may further consider knowledge of trip-counts, cache reuse analysis and compiler knowledge of trip-counts when identifying the nested loop. A nested loop which is identified by the nested loop identifier as being suitable for enhancement may be enhanced by the loop enhancer 50j. Such a nested loop may satisfy specific criteria including that the data being accessed by the inner loop of the nested loop is identified by the data identifier 50b as being invariant across iterations of the outer loop, an outer loop unroll and inner-loop reversal is legal as identified by the legality identifier 50d, and that the inner loop will access a total size of data which exceeds an available memory of cache as identified by the size identifier 50c. The nested loop unroller and reverser 50f may execute an outer loop unroll and inner-loop reversal on the nested loop when at least one of the above criteria is satisfied as identified by the nested loop identifier 50i. In some embodiments, the nested loop unroller and reverser 50f may execute an outer loop unroll and inner-loop reversal on the nested loop when all of the above criteria is satisfied as identified by the nested loop identifier 50i.

The nested loop identifier 50i may further identify if an inner loop of a nested loop in the user code should be reversed. For example, if the user code includes a nested loop including several inner loops, it may be possible to reverse an order of iteration of one of the inner loops to improve cache hits. For example, the data identifier 50b may identify whether data is invariant across iterations of the outer loop as described above. If data is invariant across iterations of the outer loop, the data identifier 50b may identify the nested loop as utilizing invariant data.

The data identifier 50b may also identify whether data used by a first of the several inner loops is accessed by a second of the several inner loops. If the timing between at least one of these accesses to the same data would be reduced by reversing one of the first and second inner loops, the data identifier 50b may identify as much, and determine whether cache hits will be improved. The data identifier 50b may further consider whether reversing the inner loop may increase time between accesses of a same data by the several inner loops (e.g., the first and second inner loops), and whether this will degrade cache hits. If the improvement to cache hits outweighs the degradation to cache hits, the data identifier 50b may identify one of the first and second inner loops as being reversible.

If one or more criteria from the following is satisfied, the nested loop identifier 50i may identify the one inner loop to be reversed by the loop enhancer 50l: the data identifier 50b identifies that invariant data exists and/or cache hits may be improved by reversing the one of the inner loops, the size identifier 50c identifies the inner loops as accessing a size of data that is greater than the available cache space, and the legality identifier 50d identifies that the reversal of the one of the inner loops (e.g., the second inner loop) would be legal. The loop reverser 50l may then reverse the identified one inner loop if one or more of the above criteria is satisfied. In some embodiments, all of the above criteria must be satisfied for the nested loop identifier 50i to identify that the one inner loop is to be reversed by the loop reverser 50l.

Based upon the identification by the nested loop identifier 50i, the loop enhancer 50j may enhance the nested loop. The loop enhancer 50j may execute several different enhancements to the nested loop, including an unroll, unroll jam, loop reversal and outer loop unroll and inner-loop reversal.

Figure 4:
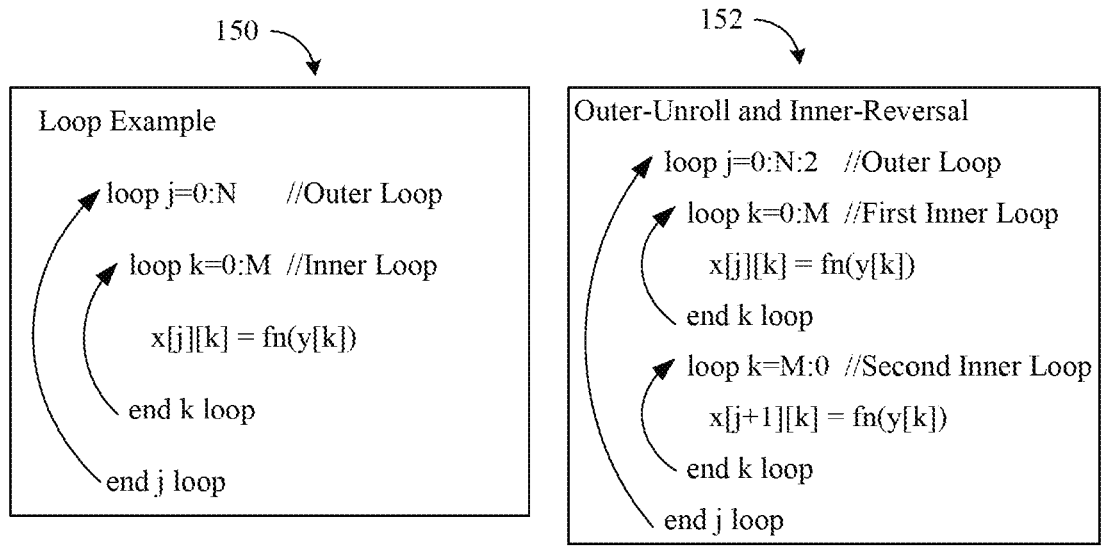
FIGS. 4-5 are examples of user code and modified code according to embodiments.

As noted above, the nested loop unroller and reverser 50f may execute a loop unroll and reverse when the criteria is satisfied. With continuing reference to FIGS. 1 and 4, user code 150 may be provided. As illustrated, the nested loop 150 includes an inner and outer loop. The user code 150 may be modified by the nested loop unroller and reverser 50f using a loop unroll and reverse as illustrated in modified code 152.

Thus, the outer-loop unroll and the inner-loop reversal may include unrolling the outer-loop of code 150 by a factor, which in the present example is two, by modifying the inner loop of code 150 to include the two inner-loop bodies, as illustrated by code 152, that include each iteration of the outer loop. For example, the second inner loop of code 152 operates on the "x[j+1][k]" array element to process the outer loop iterations which are now skipped because of the increment (i.e., two) to the outer loop of the code 152. This is followed by a reversal of the second loop of the code 152 to enhance data reuse of accesses that are invariant with respect to the outer loop index. As noted above, the factor of the unroll is two. However, other factors may be used as long as the outer loop iterations are handled by the inner loops.

Furthermore, when unroll and jam as well as the outer-loop unroll and the inner-loop reversal are both identified to enhance operation, the unroll jammer 50g may first apply an unroll jam to enhance register reuse, followed by the loop unroller and reverser 50f applying an outer-loop unroll followed by a reversal of the second inner loop. For example, the user code described above may be modified to the following Table V:

TABLE V

```
// Outer-loop Unroll-Jam
loop 'j=0:N:4'                    //Outer Loop
{
    loop 'i=0:N'                  //First Inner Loop
    {
        x[j][i]          += y[i];
        x [j+1][i]       += y[i];
    }
// Inner-loop recersal
    loop 'i=N:0'                  //Second Inner Loop:
    {
        x[j+2][i]        += y[i];
        x[j+3][i]        += y[i];
    }
}
```

The unroll jammer 50g may execute an unroll jam to unroll the outer loop by a factor of two, and jamming and/or fusing the resulting inner loops together to make the first inner loop. Thereafter, the nested loop unroller and reverser 50f may unroll the outer loop by a factor of two again to add the second inner loop, and then reverse the second inner loop.

Figure 5:
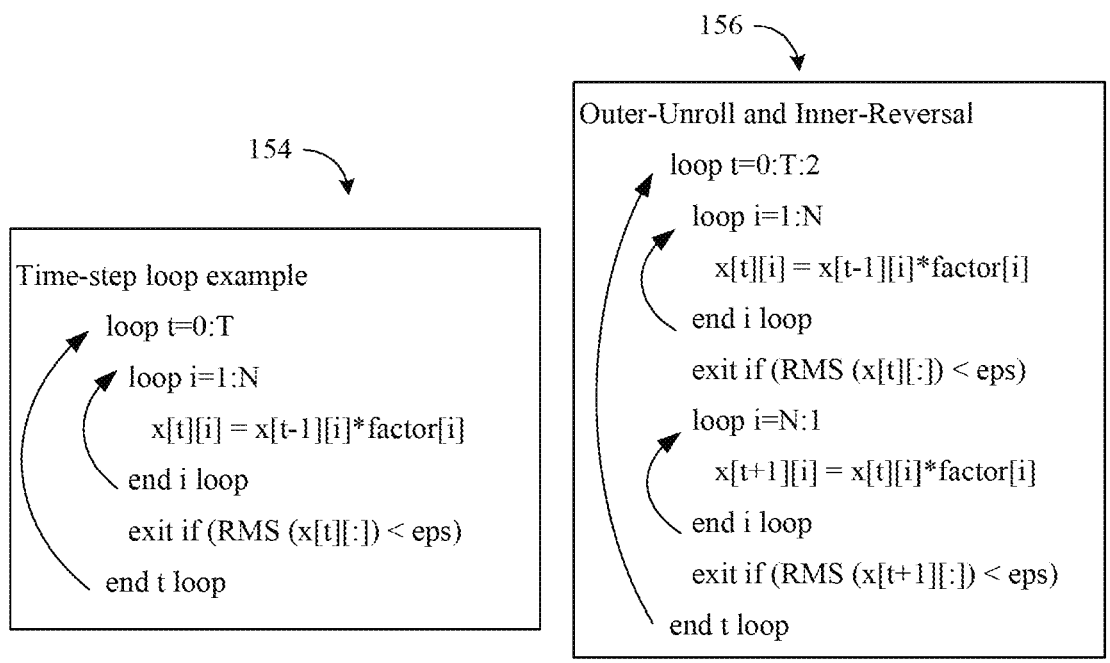

With continuing reference to FIGS. 1 and 5, the nested loop identifier 50i may identify that the nested loop of code 154 is legal for the loop unroll and reverse enhancement, but not the unroll and jam enhancement (for example a time-step loop in which iterations need data from previous iterations). The reused arrays are "x[t][i]," "x[t−1][i]" and "factor[i]." The user code 154 is provided and is labeled as "time-step loop example," with the modified code 156 being labeled as "outer-unroll and inner reversal." The outer loop of the user code 154 is unrolled by a factor of two and thus two inner-loop bodies are retained in modified code 156. This is followed by a reversal of the second loop of the modified code 156 to maximize data reuse of accesses that are invariant with respect to the outer loop index. The "reversed" loop of the modified code 156 may be vectorized and prefetched effectively on modern ISAs (e.g., AVX2 and AVX512) thus minimizing negative performance effects for the backward running loop.

An example of a user code is provided below, in which an auto-correlation is calculated and which has also been modified by an unroll and jam enhancement in Table VI.

TABLE VI

```
// Baseline Code
for(int dt=0;dt<tcor/100;dt+=4)
{
    for(int t0=0;t0<nconf;t0++)
    {
        h_acf[dt]      += h_fluxx[dt]    * h_fluxy[t0]    * h_fluxz[t0];
        h_acf[dt+1]    += h_fluxx[dt+1]  * h_fluxy[t0]    * h_fluxz[t0];
    }
    for(int t0=0;t0<nconf;t0/++)
    {
        h_acf[dt+2]    += h_fluxx[dt+2]  * h_fluxy[t0]    * h_fluxz[t0];
        h_acf[dt+3]    += h_fluxx[dt+3]  * h_fluxy[t0]    * h_fluxz[t0];
    }
}
```

To enhance cache hits, the nested loop identifier 50i may identify that the second inner loop above is to be reversed. This is because data is reused in each outer loop iteration between the first and second inner loops, and reversing the second inner loop will reduce the timing between at least some of those accesses to enhance cache hits. Furthermore, data is invariant across iterations of the outer loop. The above code may be modified by the loop reverser 50i to the following Table VII:

TABLE VII

```
for(int dt=0;dt<tcor/100;dt+=4)
{
    for(int t0=0;t0<nconf;t0++)
    {
        h_acf[dt]      += h_fluxx[dt]    * h_fluxy[t0]    * h_fluxz[t0];
        h_acf[dt+1]    += h_fluxx[dt+1]  * h_fluxy[t0]    * h_fluxz[t0];
    }
    for(int t0=nconf-1;t0>=0;t0--)
    {
        h_acf[dt02]    += h_fluxx[dt+2]  * h_fluxy[t0]    * h_fluxz[t0];
        h_acf[dt+3]    += h_fluxx[dt+3]  * h_fluxy[t0]    * h_fluxz[t0];
    }
}
```

The baseline and modified code were both measured along specific metrics to determine the improvement. The baseline code (first code) measurements are below in Table VIII:

TABLE VIII

| Back-End Bound | 23.2% of Pipeline Slots |
|---|---|
| Memory Bound | 13.7% of Pipeline Slots |

The modified code (second code) measurements are provided below in Table IX:

TABLE IX

| Back-End Bound | 12.4% of Pipeline Slots |
|---|---|
| Memory Bound | 5.5% of Pipeline Slots |

The baseline user code (which is labeled as "baseline" and is the first code) has worst performance than the enhanced reversed user code (second code). Performance gains with the outer-loop unroll and inner-loop reversal enhancement were approximately 10% to 30%. The performance gains depended on the number of threads spawned for the outer loop, the cache capacity on different processors and the trip counts. Moreover, an inspection of the compiler code-gen (e.g., an assembly listing) confirmed that it is identical for both the loops, outer-loop unroll and inner-loop reversal enhancement and baseline thus confirming that the performance gains are due to enhanced cache hits in the loop reversal optimization case. The runtime profile collected above confirmed the hypothesis, and back-end bound metrics (specifically memory boundedness) decreased with the proposed enhancement (i.e., the loop unroll and the loop reversal).

There may be loop nest patterns in some applications, such as high performance computing applications, where an outer loop contains several inner-loops that access same data, for example array elements (with data invariance across the outer-loop) with statements (or function-calls) in between the inner loops or at the end of the outer-loop body. Even in such loop-nests, it may be possible to reverse some of the inner loops without requiring any unroll of the outer-loop to get a similar data reuse benefit.

The cost-benefit analysis of this outer loop unroll and inner loop reversal is based upon information, including array-sizes, trip-counts, data-sizes and cache-sizes. In some cases, the information will be available statically. In other embodiments, information from the static compiler and a dynamic profiler to obtain at least some of the information may be needed to make the right decision by the nested loop identifier 50i. A static compiler may just provide a mechanism (e.g., pragma) or use some imperfect heuristics to guess the value and make the transformation. Moreover, an enhancement to tool integration may be provided by the above. The applicability and benefit of such an outer loop unroll and inner loop reversal or loop reversal is in machine learning, auto-correlation computations, several Standard Performance Evaluation Corporation central processing unit benchmark codes and other applications.

Figure 2:
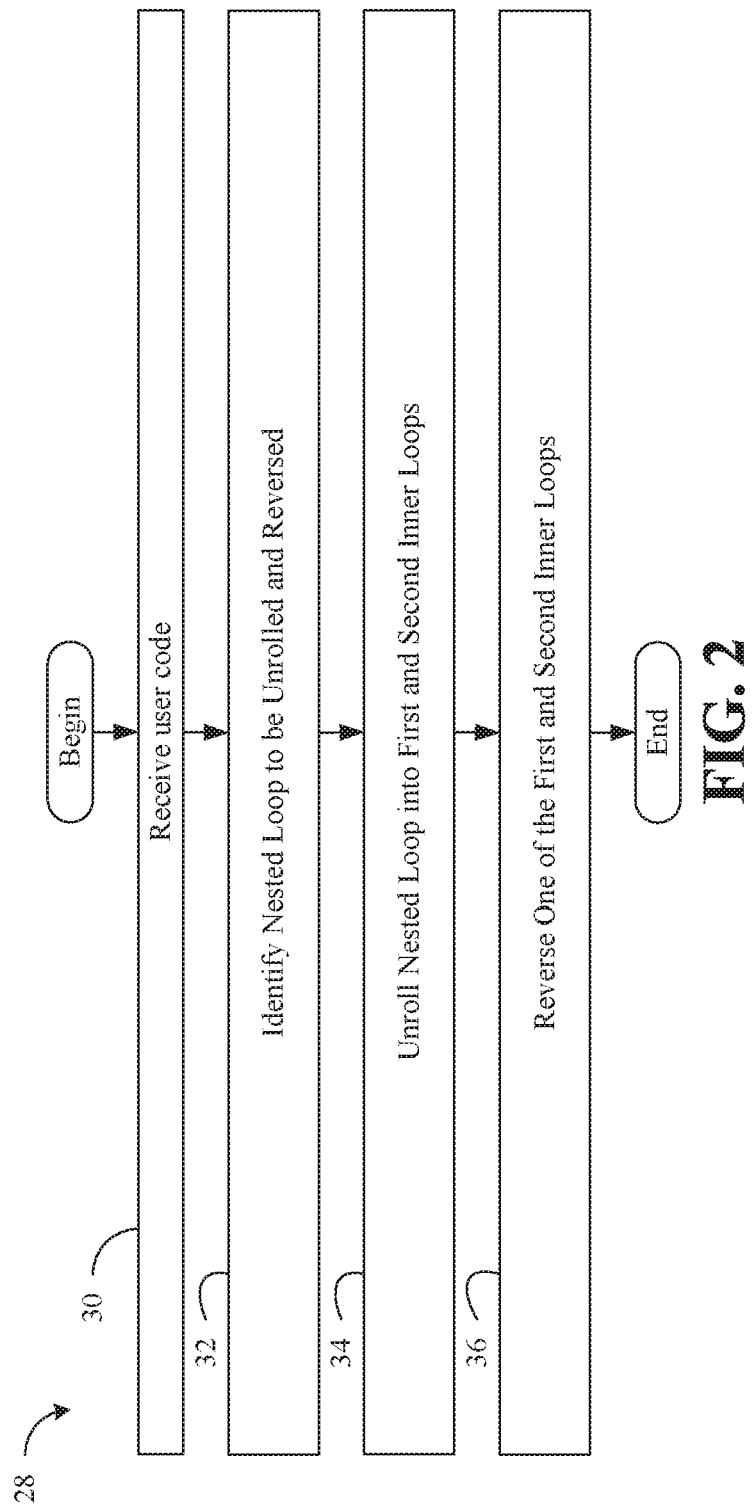
FIGS. 2-3 are flowcharts of examples of methods of handling loop nests according to an embodiment.

FIG. 2 illustrates a method 28 of compiling user code. The method 28 may be implemented as one or more modules in a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

For example, computer program code to carry out operations shown in method 28 may be written in any combination of one or more programming languages, including an object oriented programming language such as C#, Dalvik, ART, .NET, Ruby, Pearl, Python, JAVA or the like. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 30 provides for receiving user code such as, for example, source code written in a high level programming language. Block 30 may involve using, for example, a keyboard, microphone, network controller or other design interface of a computing system to obtain the user code.

A nested loop may be identified in the user code at block 32, wherein the nested loop includes an outer loop and an inner loop. The nested loop may be identified when it is determined that an outer-loop unroll and inner-loop reversal enhancement to the nested loop are legal, whether data being accessed by the inner loop of the nested loop of the user code is invariant across iterations of the outer loop, and whether the inner loop may access a total size of data which exceeds an available memory of cache.

In illustrated block 34, the nested loop is unrolled. The nested loop may be unrolled by adjusting the outer loop to increment by a factor (e.g., 2), and adjusting the inner loop to execute the skipped outer loops. In this example, the inner loop may be modified into first and second inner loops based upon the factor. In illustrated block 36, one of the first and second inner loops may be reversed. The reversal may enhance cache hits. As already noted, a cache hit may mean that data requested for processing by a component (e.g., Central Processing Unit) or application is found in the cache memory, whereas a cache miss may occur when the data is not found in cache memory.

Figure 3:
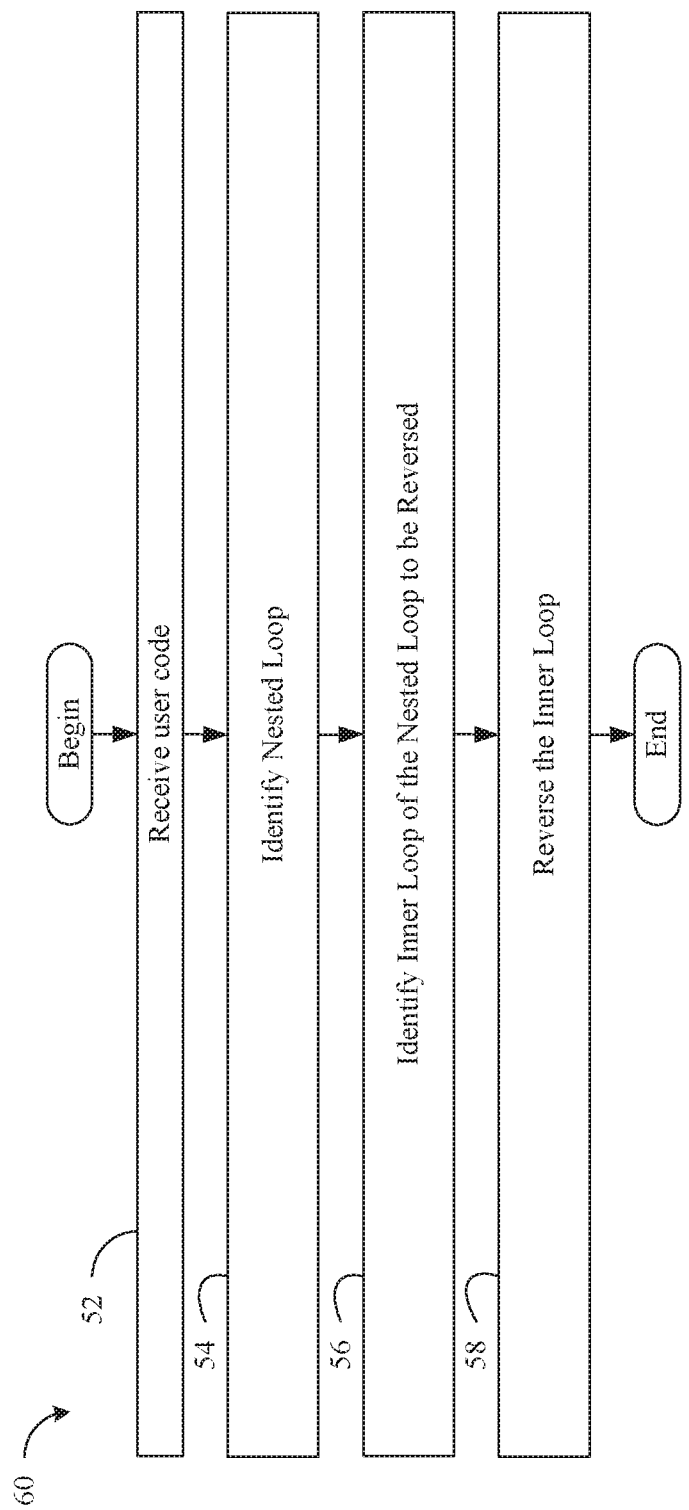

FIG. 3 illustrates a method 60 of compiling user code. The method 60 may be implemented as one or more modules in a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof. For example, computer program code to carry out operations shown in method 60 may be written in any combination of one or more programming languages, including an object oriented programming language such as C#, Dalvik, ART, .NET, Ruby, Pearl, Python, JAVA or the like.

Illustrated processing block 52 provides for receiving user code such as, for example, source code written in a high level programming language. Block 52 may involve using, for example, a keyboard, microphone, network controller or other design interface of a computing system to obtain the user code.

A nested loop may be identified in the user code at block 52, wherein the nested loop includes an outer loop and several inner loops. Illustrated processing block 54 may identify an inner loop out of the inner loops to be reversed. For example, the inner loop may be identified when an inner-loop reversal enhancement is legal, whether data being accessed by the several inner loops of the user code is invariant across iterations of the outer loop and/or reused by the inner loops during a same iteration of the outer loop, and whether the inner loop accesses a total size of data which exceeds an available memory of cache. In illustrated block 58, the inner loop is reversed. The reversal may enhance cache hits. As already noted, a cache hit may mean that data requested for processing by a component (e.g., Central Processing Unit) or application is found in the cache memory, whereas a cache miss may occur when the data is not found in cache memory.

Figure 6:
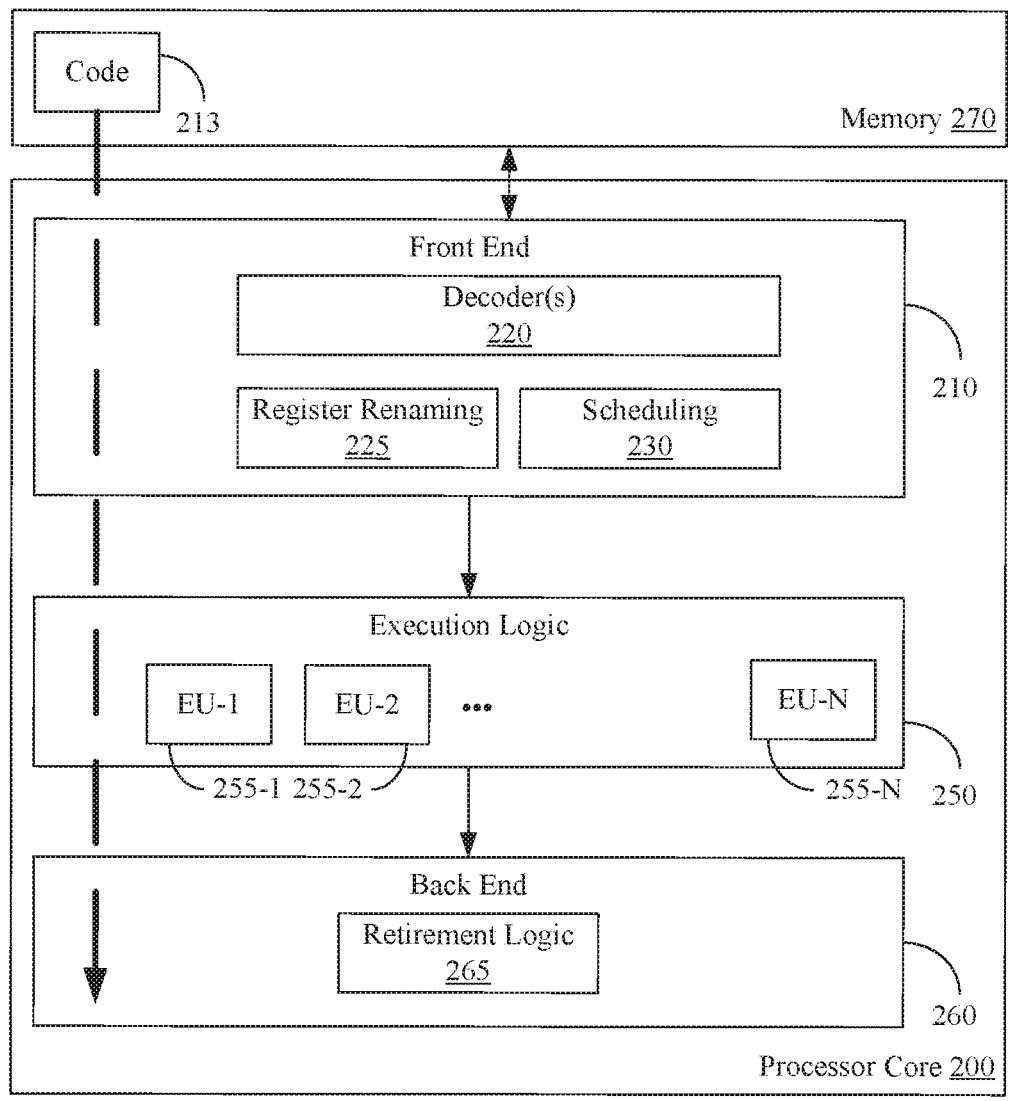
FIG. 6 is a block diagram of an example of a processor according to an embodiment.

FIG. 6 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 6, a processing element may alternatively include more than one of the processor core 200 illustrated in FIG. 6. The processor core 200 may be a single-threaded core or, for at least one embodiment, the processor core 200 may be multithreaded in that it may include more than one hardware thread context (or "logical processor") per core.

FIG. 6 also illustrates a memory 270 coupled to the processor core 200. The memory 270 may be any of a wide variety of memories (including various layers of memory hierarchy) as are known or otherwise available to those skilled in the art. The memory 270 may include one or more code 213 instruction(s) to be executed by the processor core 200, wherein the code 213 may implement the nested loop identifier 50*i* (FIG. 1), the loop enhancer 50*j* (FIG. 1), the cache information retriever 50*k* (FIG. 1), the method 28 (FIG. 2) and/or the method 60 (FIG. 3), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those skilled in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 6, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 7:
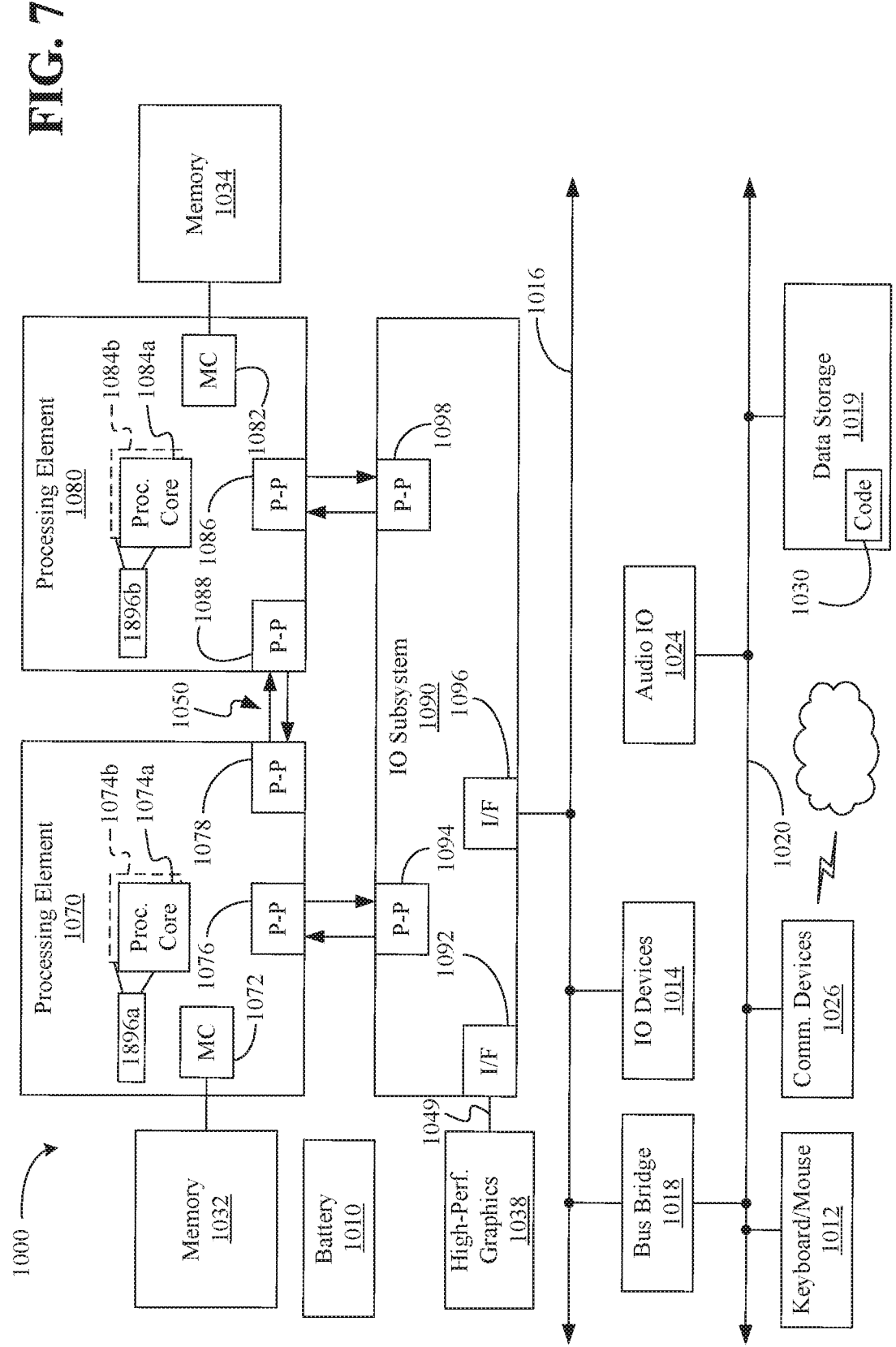
FIG. 7 is a block diagram of an example of a system according to an embodiment.

Referring now to FIG. 7, shown is a block diagram of a system 1000 in accordance with an embodiment. Shown in FIG. 7 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 7 may be implemented as a multi-drop bus rather than point-to-point interconnect.

As shown in FIG. 7, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 6.

Each processing element 1070, 1080 may include at least one shared cache 1896a, 1896b (e.g., static random access memory/SRAM). The shared cache 1896a, 1896b may store data (e.g., objects, instructions) that are utilized by one or more components of the processor, such as the cores 1074a, 1074b and 1084a, 1084b, respectively, and may correspond to a "cache memory." For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an to element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro-architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 7, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 7, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 7, various I/O devices 1014 (e.g., cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, network controllers/communication device(s) 1026 (which may in turn be in communication with a computer network), and a data storage unit 1019 such as a disk drive or other mass storage device which may include code 1030, in one embodiment. The code 1030 may include instructions for performing embodiments of one or more of the methods described above. Thus, the illustrated code 1030 may implement the nested loop identifier 50i (FIG. 1), the loop enhancer 50j (FIG. 1), the cache information retriever 50k (FIG. 1), the method 28 (FIG. 2) and/or the method 60 (FIG. 3), already discussed, and may be similar to the code 213 (FIG. 6), already discussed. Further, an audio I/O 1024 may be coupled to second bus 1020.

Note that other embodiments are contemplated. For example, instead of the point-to-point architecture of FIG. 7, a system may implement a multi-drop bus or another such communication topology. Also, the elements of FIG. 7 may alternatively be partitioned using more or fewer integrated chips than shown in FIG. 7.

Figure 8:
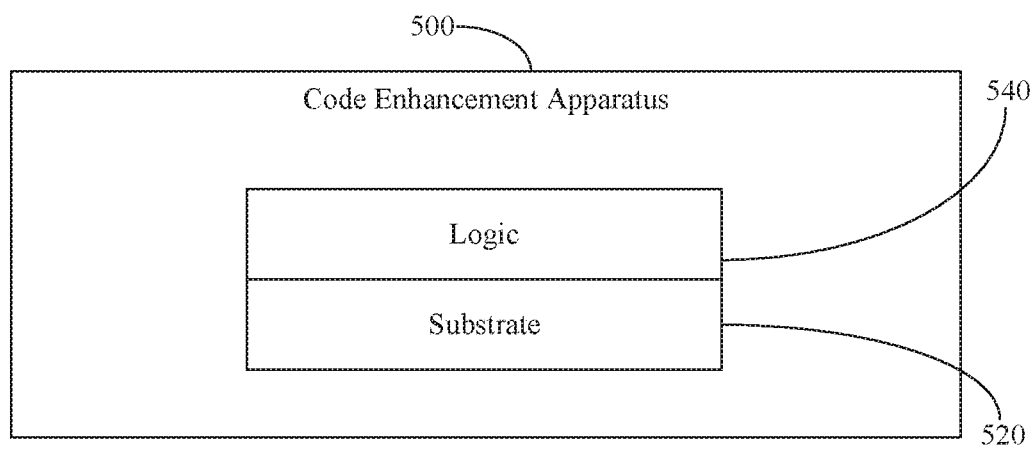
FIGS. 8-9 illustrate examples of code enhancing devices according to embodiments of the disclosure.

FIG. 8 illustrates a code enhancement apparatus 500. The code enhancement apparatus 500 may implement one or more aspects of the methods 28 and 60 (FIGS. 2 and 3) and may be readily substituted for the code enhancer 50m (FIG. 1), already discussed. The illustrated code enhancement apparatus 500 includes a substrate 520 (e.g., silicon, sapphire, gallium arsenide) and logic 540 (e.g., transistor array and other integrated circuit/IC components) coupled to the substrate 520. The logic 540 may be implemented at least partly in configurable logic or fixed-functionality logic hardware. The logic 540 may implement a compiler including the nested loop identifier 50i (FIG. 1), the loop enhancer 50j (FIG. 1), the cache information retriever 50k (FIG. 1), and/or configured to execute the method 28 (FIG. 2) and/or the method 60 (FIG. 3), already discussed.

Figure 9:
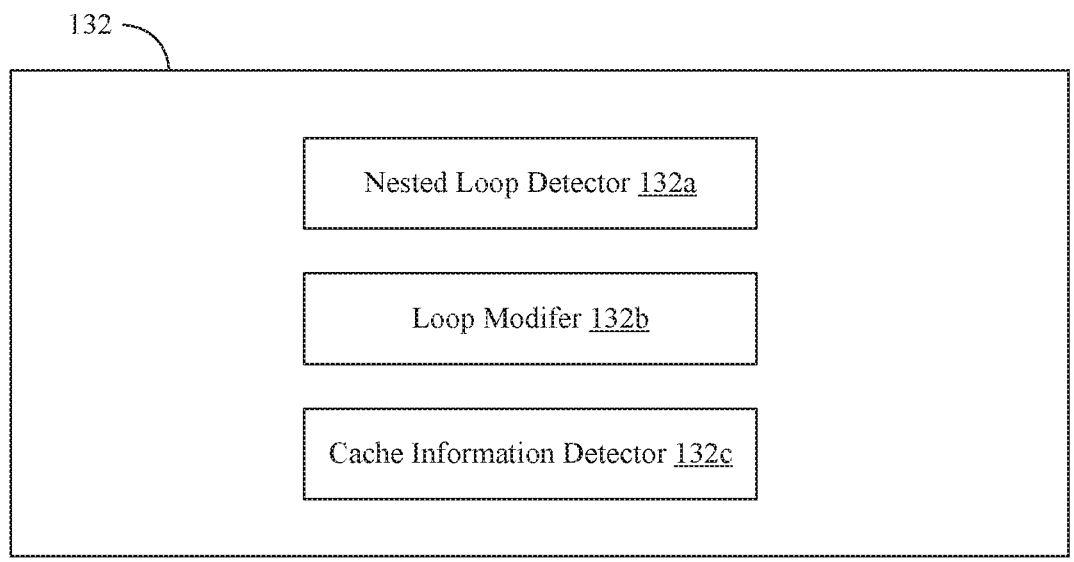

FIG. 9 shows a code modifier 132 (132a-132c) that may implement one or more aspects of the nested loop identifier 50i (FIG. 1), the loop enhancer 50j (FIG. 1), the cache information retriever 50k (FIG. 1), the method 28 (FIG. 2) and/or the method 60 (FIG. 3). The code modifier 132, which may include logic instructions, to configurable logic, fixed-functionality hardware logic, may be readily substituted for the code enhancer 50m, already discussed. The nested loop detector 132a may identify in a user code, a nested loop which would result in cache memory misses of the cache memory when executed. The cache information detector 132c may retrieve and/or determine an available space of a cache of a computing system which is to execute the compiled user code. The nested loop detector 132a may compare the available space of the cache to a total size of data required by an inner loop of the nested loop. The loop modifier 132b may modify the nested loop to a modified nested loop by reversing an order of iterations of a first inner loop to enhance a number of times that cache memory hits of the cache memory occur when the modified nested loop is executed. As already noted, a cache hit may mean that data requested for processing by a component (e.g., Central Processing Unit) or application is found in the cache memory, whereas a cache miss may occur when the data is not found in cache memory.

ADDITIONAL NOTES AND EXAMPLES

Example 1 may include a code utility system, comprising a design interface to receive user code, a cache memory, and a compiler coupled to the design interface and the cache memory, the compiler to identify in the user code, a nested loop which would result in cache memory misses of the cache memory when executed, and reverse an order of iterations of a first inner loop in the nested loop to obtain a modified nested loop, wherein reverse the order of iterations increases a number of times that cache memory hits occur when the modified nested loop is executed.

Example 2 may include the system of example 1, wherein the compiler is to unroll an outer loop of the nested loop by a factor, wherein the unroll is to modify an inner loop of the nested loop based upon the factor into the first inner loop and a second inner loop.

Example 3 may include the system of example 1, wherein to identify the nested loop, the compiler is to identify an inner loop of the nested loop as accessing data which is invariant across iterations of an outer loop of the nested loop.

Example 4 may include the system of example 1, wherein to identify the nested loop, the compiler is to identify an inner loop of the nested loop as accessing a total size of data which exceeds an available memory of the cache memory.

Example 5 may include the system of example 1, wherein to identify the nested loop, the compiler is to identify that an inner loop of the nested loop does not have loop-carried dependencies.

Example 6 may include the system of any one of examples 1-5, wherein the compiler is to modify the user code by executing an unroll and jam on the nested loop.

Example 7 may include an apparatus to compile user code, comprising a substrate, and logic coupled to the substrate and implemented at least partly in one or more of configurable logic or fixed-functionality logic hardware, the logic to identify in the user code, a nested loop which would result in cache memory misses of cache memory when executed, and reverse an order of iterations of a first inner loop in the nested loop to obtain a modified nested loop, wherein reverse the order of iterations increases a number of times that cache memory hits occur when the modified nested loop is executed.

Example 8 may include the apparatus of example 7, wherein the logic is to unroll an outer loop of the nested loop by a factor, wherein the unroll is to modify an inner loop of the nested loop based upon the factor into the first inner loop and a second inner loop.

Example 9 may include the apparatus of example 7, wherein to identify the nested loop, the logic is to identify an inner loop of the nested loop as accessing data which is invariant across iterations of an outer loop of the nested loop.

Example 10 may include the apparatus of example 7, wherein to identify the nested loop, the logic is to identify an inner loop of the nested loop as accessing a total size of data which exceeds an available memory of the cache memory.

Example 11 may include the apparatus of example 7, wherein to identify the nested loop, the logic is to identify that an inner loop of the nested loop does not have loop-carried dependencies.

Example 12 may include the apparatus of any one of examples 7-11, wherein the logic is to modify the user code by executing an unroll and jam on the nested loop.

Example 13 may include a method of compiling user code, comprising identifying in the user code, a nested loop which would result in cache memory misses when executed, and reversing an order of iterations of a first inner loop in the nested loop to obtain a modified nested loop, wherein reversing the order of iterations increases a number of times that cache memory hits occur when the modified nested loop is executed.

Example 14 may include the method of example 13, wherein further comprising unrolling an outer loop of the nested loop by a factor, the unrolling including modifying an inner loop of the nested loop based upon the factor into the first inner loop and a second inner loop.

Example 15 may include the method of example 13, wherein the identifying includes identifying an inner loop of the nested loop as accessing data which is invariant across iterations of an outer loop of the nested loop.

Example 16 may include the method of example 13, wherein the identifying includes identifying an inner loop of the nested loop as accessing a total size of data which exceeds an available memory of cache memory.

Example 17 may include the method of example 13, wherein the identifying includes identifying that an inner loop of the nested loop does not have loop-carried dependencies.

Example 18 may include the method of any one of examples 13-17, wherein further comprising modifying the user code by executing an unroll and jam on the nested loop.

Example 19 may include at least one computer readable storage medium comprising a set of instructions which, when executed by a computing system, cause the computing system to identify in a user code, a nested loop which would result in cache memory misses when executed, and reverse an order of iterations of a first inner loop in the nested loop to obtain a modified nested loop, wherein the reverse the order of iterations increases a number of times that cache memory hits occur when the modified nested loop is executed.

Example 20 may include the at least one computer readable storage medium of example 19, wherein the instructions, when executed, cause the computing system to unroll an outer loop of the nested loop by a factor, wherein the unroll is to modify an inner loop of the nested loop based upon the factor into the first inner loop and a second inner loop.

Example 21 may include the at least one computer readable storage medium of example 19, wherein the identify the nested loop is to identify an inner loop of the nested loop as accessing data which is invariant across iterations of an outer loop of the nested loop.

Example 22 may include the at least one computer readable storage medium of example 19, wherein the identify the nested loop is to identify an inner loop of the nested loop as accessing a total size of data which exceeds an available memory of cache memory.

Example 23 may include the at least one computer readable storage medium of example 19, wherein the identify the nested loop is to identify that an inner loop of the nested loop does not have loop-carried dependencies.

Example 24 may include the at least one computer readable storage medium of any one of examples 19-23, wherein the instructions, when executed, cause the computing system to modify the user code by executing an unroll and jam on the nested loop.

Example 25 may include an apparatus to compile user code, comprising means for identifying in the user code, a nested loop which would result in cache memory misses when executed, and means for reversing an order of iterations of a first inner loop in the nested loop to obtain a modified nested loop, wherein reversing the order of iterations increases a number of times that cache memory hits occur when the modified nested loop is executed.

Example 26 may include the apparatus of example 25, further comprising a means for unrolling an outer loop of the nested loop by a factor, the means for unrolling is to modify an inner loop of the nested loop based upon the factor into the first inner loop and a second inner loop.

Example 27 may include the apparatus of example 25, wherein the means for identifying includes a means for identifying an inner loop of the nested loop as accessing data which is invariant across iterations of an outer loop of the nested loop.

Example 28 may include the apparatus of example 25, wherein the means for identifying includes a means for identifying an inner loop of the nested loop as accessing a total size of data which exceeds an available memory of cache memory.

Example 29 may include the apparatus of example 25, wherein the means for identifying includes means for identifying that an inner loop of the nested loop does not have loop-carried dependencies.

Example 30 may include the apparatus of any one of examples 25-29, further comprising a means for modifying the user code by executing an unroll and jam on the nested loop.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:
1. A code utility system, comprising:
a design interface to receive user code;
a cache memory; and
a memory storing a set of instructions, which when executed by the code utility system, cause the code utility system to implement a compiler communicatively coupled to the design interface and the cache memory, the compiler to:

identify, in the user code, a nested loop which would result in cache memory misses of the cache memory when the nested loop is executed;

identify, in the nested loop, a first iterative inner loop and a second iterative inner loop that is located after the first iterative inner loop, wherein the second iterative inner loop of the nested loop is to be associated with an order of iterations, and wherein, in the nested loop, an outer loop includes the first and second iterative inner loops; and reverse the order of iterations of the second iterative inner loop of the nested loop to generate a modified nested loop based on an identification that one or more iterations of the second iterative inner loop of the nested loop is to access data associated with one or more iterations of the first iterative inner loop of the nested loop, wherein the reversal of the order of iterations of the first iterative inner loop of the nested loop increases a number of times that cache memory hits of the cache memory occur when the modified nested loop is executed.

2. The code utility system of claim 1, wherein the compiler is to:

unroll the outer loop of the nested loop by a factor; and modify an iterative inner loop of the nested loop based upon the factor into the first iterative inner loop of the nested loop and the second iterative inner loop of the nested loop.

3. The code utility system of claim 1, wherein to identify the nested loop, the compiler is to identify an iterative inner loop of the nested loop as accessing data which is invariant across iterations of the outer loop of the nested loop.

4. The code utility system of claim 1, wherein to identify the nested loop, the compiler is to identify an iterative inner loop of the nested loop as accessing a total size of data which exceeds an available memory of the cache memory.

5. The code utility system of claim 1, wherein to identify the nested loop, the compiler is to identify that an iterative inner loop of the nested loop does not have loop-carried dependencies.

6. The code utility system of claim 1, wherein the compiler is to modify the user code by executing a loop unroll and jam on the nested loop.

7. An apparatus to compile user code, comprising:

a substrate; and logic coupled to the substrate and implemented at least partly in one or more of configurable logic or fixed-functionality logic hardware, the logic to:

identify, in the user code, a nested loop which would result in cache memory misses of a cache memory when the nested loop is executed;

identify, in the nested loop, a first iterative inner loop and a second iterative inner loop that is located after the first iterative inner loop, wherein the second iterative inner loop of the nested loop is to be associated with an order of iterations, and wherein, in the nested loop, an outer loop includes the first and second iterative inner loops; and reverse the order of iterations of the second iterative inner loop of the nested loop to generate a modified nested loop based on an identification that one or more iterations of the second iterative inner loop of the nested loop is to access data associated with one or more iterations of the first iterative inner loop of the nested loop, wherein the reversal of the order of iterations of the first iterative inner loop of the nested loop increases a number of times that cache memory hits of the cache memory occur when the modified nested loop is executed.

8. The apparatus of claim 7, wherein the logic is to:

unroll the outer loop of the nested loop by a factor; and modify an iterative inner loop of the nested loop based upon the factor into the first iterative inner loop of the nested loop and the second iterative inner loop of the nested loop.

9. The apparatus of claim 7, wherein to identify the nested loop, the logic is to identify an iterative inner loop of the nested loop as accessing data which is invariant across iterations of the outer loop of the nested loop.

10. The apparatus of claim 7, wherein to identify the nested loop, the logic is to identify an iterative inner loop of the nested loop as accessing a total size of data which exceeds an available memory of the cache memory.

11. The apparatus of claim 7, wherein to identify the nested loop, the logic is to identify that an iterative inner loop of the nested loop does not have loop-carried dependencies.

12. The apparatus of claim 7, wherein the logic is to modify the user code by executing a loop unroll and jam on the nested loop.

13. A method of compiling user code, comprising:

identifying, in the user code, a nested loop which would result in cache memory misses of a cache memory when the nested loop is executed;

identifying, in the nested loop, a first iterative inner loop and a second iterative inner loop that is located after the first iterative inner loop, wherein the second iterative inner loop of the nested loop is to be associated with an order of iterations, and wherein, in the nested loop, an outer loop includes the first and second iterative inner loops; and reversing the order of iterations of the second iterative inner loop of the nested loop to generate a modified nested loop based on an identification that one or more iterations of the second iterative inner loop of the nested loop is to access data associated with one or more iterations of the first iterative inner loop of the nested loop, wherein reversing the order of iterations of the first iterative inner loop of the nested loop increases a number of times that cache memory hits of the cache memory occur when the modified nested loop is executed.

14. The method of claim 13, further comprising:

unrolling the outer loop of the nested loop by a factor; and modifying an iterative inner loop of the nested loop based upon the factor into the first iterative inner loop of the nested loop and the second iterative inner loop of the nested loop.

15. The method of claim 13, wherein the identifying the nested loop includes identifying an iterative inner loop of the nested loop as accessing data which is invariant across iterations of the outer loop of the nested loop.

16. The method of claim 13, wherein the identifying the nested loop includes identifying an iterative inner loop of the nested loop as accessing a total size of data which exceeds an available memory of the cache memory.

17. The method of claim 13, wherein the identifying the nested loop includes identifying that an iterative inner loop of the nested loop does not have loop-carried dependencies.

18. The method of claim 13, further comprising modifying the user code by executing a loop unroll and jam on the nested loop.

19. At least one non-transitory computer-readable storage medium storing a set of instructions which, when executed by a computing system, cause the computing system to:
- identify, in a user code, a nested loop which would result in cache memory misses of a cache memory when the nested loop is executed;
- identify, in the nested loop, a first iterative inner loop and a second iterative inner loop that is located after the first iterative inner loop, wherein the second iterative inner loop of the nested loop is to be associated with an order of iterations, and wherein, in the nested loop, an outer loop includes the first and second iterative inner loops; and
- reverse the order of iterations of the second iterative inner loop of the nested loop to generate a modified nested loop based on an identification that one or more iterations of the second iterative inner loop of the nested loop is to access data associated with one or more iterations of the first iterative inner loop of the nested loop, wherein the reversal of the order of iterations of the first iterative inner loop of the nested loop increases a number of times that cache memory hits of the cache memory occur when the modified nested loop is executed.

20. The at least one non-transitory computer-readable storage medium of claim 19, wherein the set of instructions which, when executed by the computing system, cause the computing system to:
- unroll the outer loop of the nested loop by a factor; and
- modify an iterative inner loop of the nested loop based upon the factor into the first iterative inner loop of the nested loop and the second iterative inner loop of the nested loop.

21. The at least one non-transitory computer-readable storage medium of claim 19, wherein the set of instructions which, when executed by the computing system, cause the computing system to identify an iterative inner loop of the nested loop as accessing data which is invariant across iterations of the outer loop of the nested loop.

22. The at least one non-transitory computer-readable storage medium of claim 19, wherein the set of instructions which, when executed by the computing system, cause the computing system to identify an iterative inner loop of the nested loop as accessing a total size of data which exceeds an available memory of the cache memory.

23. The at least one non-transitory computer-readable storage medium of claim 19, wherein the set of instructions which, when executed by the computing system, cause the computing system to identify that an iterative inner loop of the nested loop does not have loop-carried dependencies.

24. The at least one non-transitory computer-readable storage medium of claim 19, wherein the set of instructions which, when executed by the computing system, cause the computing system to modify the user code by executing a loop unroll and jam on the nested loop.

* * * * *